March 18, 1952  R. E. CAMPBELL ET AL  2,589,771
TIRE SPREADER
Filed June 30, 1949
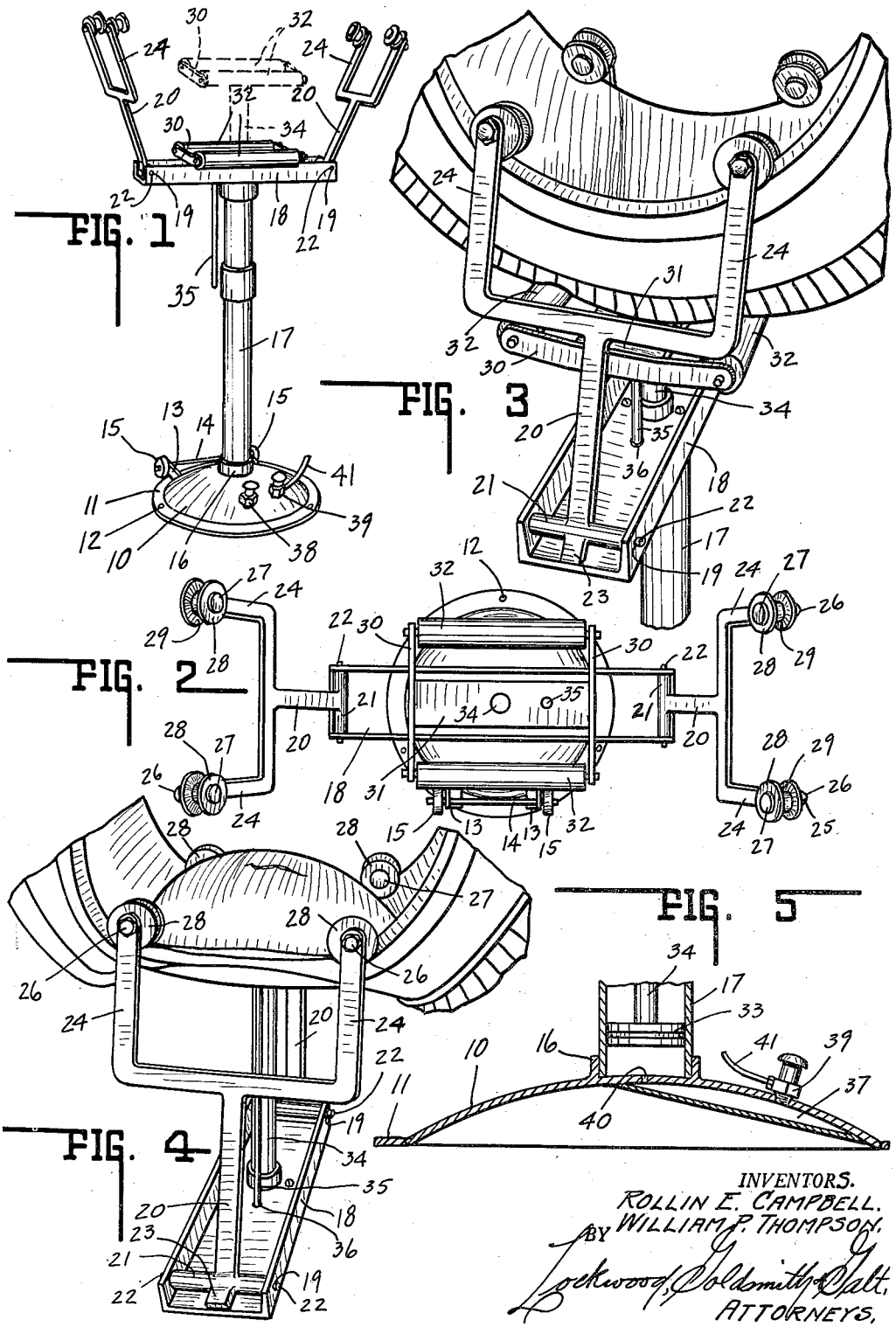
INVENTORS.
ROLLIN E. CAMPBELL.
WILLIAM P. THOMPSON.
BY
Lockwood, Goldsmith & Galt.
ATTORNEYS.

Patented Mar. 18, 1952

2,589,771

UNITED STATES PATENT OFFICE 2,589,771

TIRE SPREADER

Rollin E. Campbell and William P. Thompson, Anderson, Ind.

Application June 30, 1949, Serial No. 102,366

1 Claim. (Cl. 254—50.3)

This invention relates to a tire spreader device which may or may not be portable as desired.

The chief object of the present invention is to provide a device that has grippers to engage opposite bead portions of a carcass while the intermediate tread portion is supported upon rollers to facilitate examination, the grippers and rollers being relatively movable to spread out the carcass at a defect or break therein and extend upwardly in reverse bulge position the same for repair purposes.

The chief feature of the present invention resides in coordination of the bead engaging arms and the supporting platform whereby the tire casing may be readily rotated for inspection and then when desired the casing can be reversely and locally distended for repair purposes.

Another feature of the present invention resides in the use of air pressure or the like to effect distention.

A further feature of the present invention resides in the portable character of the device.

Other objects and features of the invention will be set forth more fully hereinafter.

The full nature of the invention will be understood from the accompanying drawings and the following description and claim:

In the drawings, Fig. 1 is a perspective view of an embodiment of the invention with the bead engaging arms in extended or open relation and the platform lowered to receive a casing, dotted lines indicating an elevated position of the platform.

Fig. 2 is a top plan view.

Fig. 3 is a perspective view of the casing engaging parts in tire casing engaging position to facilitate tire rotation.

Fig. 4 is a perspective view of the same parts with the tire spread and the defective portion elevated for repair purposes.

Fig. 5 is a sectional view of the cylinder and piston structure and associated parts.

In the drawings, 10 indicates a base having a rim portion 11 apertured at 12 and adapted for lag screw or bolt connection to a supporting surface. Projecting upwardly and outwardly therefrom are ears 13 mounting axle 14 upon which, in outboard relation, are mounted wheels 15. The structure thus is readily portable when tipped so that said wheels engage the supporting surface.

Secured to base 10 is flange 16 mounting tubular standard 17. The same at its upper end rotatably supports a transversely disposed upwardly directed channel base member 18. At the ends thereof are the holes 19. A Y-shaped member 20 is provided at the lower end of the stem with oppositely directed longitudinal aligned portions 21 pivotally mounted as at 22 in said holes 19. A tail extension 23 serves as a stop to limit outward tilting of the Y-member.

Each arm 24 of the Y-member mounts a trunnion or stub shaft anchored as at 26. Rotatable on said shaft between the arm and head 27 is a grooved wheel, spool or roller 28 grooved as at 29 for bead accommodation.

Extending transversely of the base member 18 and disposed above the same is a platform comprised of two parallel curved bar members 30 secured together in spaced relation by central member 31. Extending across the platform and forming end portions thereof are the slightly elevated rotatably mounted rollers 32.

To central member 31 is secured the upper end of piston rod 34. The latter within the tubular standard mounts a piston 33. Central member 31 mounts depending member 35 which extends through hole 36 in the channel 18. This is to prevent relative rotative displacement yet permit the channel and platform to have relative vertical movement and permit both to rotate if desired.

On base 10 is a valve controlled structure 37 connecting at 40 to the cylinder formed in the tubular standard 17. A pair of valves 38 and 39 connect to said structure 37. Valve 38 vents to the atmosphere. Valve 39 connects to pressure supply line 41.

Operation is as follows: A tire casing is disposed on the platform and the Y-shaped arms turned in towards each other until the spools engage the opposed beads. The right hand button 39 then is depressed which supplies air to the cylinder to lift the piston and platform. This continues until the tire beads are spaced apart approximately the width of the tread.

Button 39 thus has opened the inlet valve. When this displacement has occurred and button 39 is released, the tire casing can now be readily rotated for inspection. When a defective or suspected area is encountered it is disposed immediately above the platform. Button 39 is again depressed. This supplies additional air to the cylinder and the piston and platform are further elevated. In this operation the Y-shaped members through the spools hold the beads while the defective or suspected portion of the casing is bulged upward or reversely curved. Thus such casing portion is conveniently exposed for repair purposes.

Following casing repair the left hand button 38 is depressed. This releases the cylinder trapped air, permits the piston, rod and platform to lower and the tire resumes its normal position. Each of the valves is normally closed and the intake valve on its intake side connects by portion 41 to a source of air pressure not shown. The exhaust valve on its exhaust side vents to atmosphere. The opposite sides of both valves freely communicate with the air cylinder through port 40.

When the platform is lowered the tire can be readily removed and replaced by another casing. The air pressure power is simple, efficient and effortless. Various features herein disclosed, as indicated, may be omitted if desired.

The foregoing description is, however, merely illustrative of one and the preferred embodiment of the invention. Various modifications, as herein indicated, and others which will suggest themselves to persons skilled in this art, all are considered within the scope of this invention, reference being had to the appended claim for definition thereof.

The invention claimed is:

A tire spreader including a tubular column comprising a fluid pressure cylinder, a transversely disposed vertically stationary base rotatably supported at the upper end thereof, a pair of tire bead engaging arms tiltably mounted upon the ends of said base, a platform disposed above said base and vertically movable toward and away from same and rotatable with the base, and a piston operating in said cylinder for raising and lowering said platform, wherein the platform comprises a pair of spaced and curved bar members, the concavity being upon the upper side, a pair of parallel rollers at the ends of the bar members and disposed in bridging relation thereto, and other means between said bar members and disposed parallel to said rollers and between and below the same.

ROLLIN E. CAMPBELL.
WILLIAM P. THOMPSON.

REFERENCES CITED

The following references are of record in the file of this patent:

UNITED STATES PATENTS

| Number | Name | Date |
|---|---|---|
| 1,848,961 | Manley | Mar. 8, 1932 |
| 1,973,803 | Frauen | Sept. 18, 1934 |
| 2,043,169 | Hawkinson | June 2, 1936 |